Patented Nov. 12, 1935

2,020,651

UNITED STATES PATENT OFFICE 2,020,651

CONDENSATION PRODUCT OF THE OXAZINE SERIES

Georg Kalischer, Cologne-on-the-Rhine-Marienburg, and Werner Zerweck, Frankfort-on-the-Main-Fechenheim, Germany, assignors to General Aniline Works, Inc., New York, N. Y., a corporation of Delaware No Drawing. Application July 11, 1933, Serial No. 679,984. In Germany July 16, 1932

4 Claims. (Cl. 260—28)

Our invention relates to new condensation products of the oxazine series of the general formula

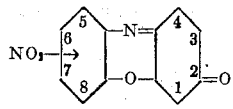

in which both nuclei may be linked with a further benzene nucleus, both nuclei may contain halogen atoms and the quinoid nucleus may contain instead of oxygen a further radicle

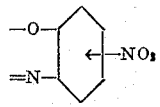

and a process of making the said products.

As is well known, quinone and particularly halogenated quinones condense with o-amino-aryl-mercaptans with the formation of dyestuffs of the thiazine series. The condensation of chloranil and one molecular proportion of 2-amino-3-methyl-5-phenyl-aminothiophenol, for example, takes place according to the following equation:—

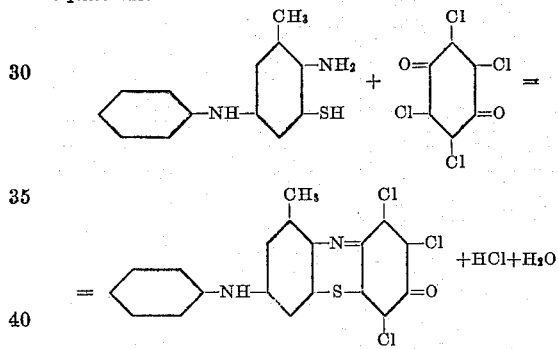

(cf. U. S. Patent 1,588,384).

It is impossible to apply this condensation reaction to o-aminophenols and their alkyl-derivatives, since the corresponding oxazine compounds are not formed, but rather the quinone in this case only has an oxidizing effect.

In accordance with the present invention in contradistinction to this latter fact o-amino-phenols of the benzene or naphthalene series containing a nitro-group in the molecule are capable of the above condensation reaction with quinones and halogenated quinones of the benzene or naphthalene series with the formation of new condensation products of the oxazine series. 1,4-quinones, which may be substituted by halogen in the 2- and 5-position, are capable of reacting with one or also with two molecular proportions of nitro-o-aminophenols. For example, the condensation of chloranil with one and two molecular proportions respectively of 5-nitro-2-aminophenol yields the following compounds:—

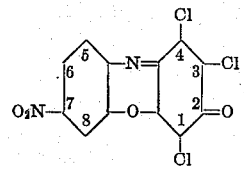

and

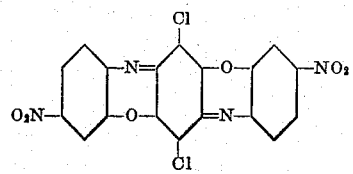

respectively.

The nitro-oxazines thus obtainable in a very good yield are intensely colored compounds which may be used as pigment dyestuffs; in part they are important intermediates for the production of further conversion products, particularly of sulfur dyestuffs. They can be transformed by usual methods into the corresponding amino-compounds and their N-alkyl-, aryl-, aralkyl- and acyl-derivatives. Their corresponding diazo-compounds are capable of the well known reactions of this type, so that the fundamental unsubstituted oxazones and otherwise substituted derivatives are obtainable.

If the nitroaminophenol compound used as the one reaction component contains a further acid substituent such as a sulfonic acid or a further nitro-group the condensation reaction probably runs in such a way that in the first phase one molecular proportion of the quinone reacts with two molecular proportions of a component of such kind with the formation of a diarylidoquinone compound which is decomposed in the second phase while splitting off two molecules of water with the formation of a triphendioxazine compound.

In order to further illustrate our invention the following examples are given, the parts being by weight and all temperatures in centigrade degrees; but we wish it, however, to be understood that our invention is not limited to the particular products nor reaction conditions given therein:—

*Example 1*

30 parts of 2,5-dibromquinone are mixed with 15.4 parts of 5-nitro-2-aminophenol, 10 parts of anhydrous sodium acetate and about 250 parts of alcohol, and the mixture is stirred for some time at ordinary temperature, the precipitated reaction product is filtered off, washed with alcohol and then with water and dried. In this manner the 3-bromo-7-nitro-phenoxazone-2 is obtained in a good yield. When recrystallized from glacial acetic acid it forms brown crystals soluble in concentrated sulfuric acid with an olive-brown color. The new product corresponds with the probable formula:

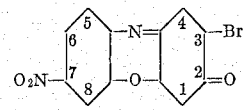

Instead of 2.5-dibromquinone the equivalent quantity of benzoquinone itself may be used.

*Example 2*

20 parts of 2,6-dichloroquinone are condensed with 15.4 parts of 5-nitro-2-aminophenol according to Example 1. The 4-chloro-7-nitro-phenoxazone-2 thus obtained of the probable formula

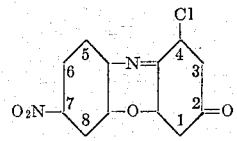

is very similar to the product of Example 1, it is likewise recrystallizable from glacial acetic acid and dissolves in concentrated sulfuric acid with an olive-brown color.

*Example 3*

28 parts of chloranil are allowed to act according to Example 1 upon 15.4 parts of 5-nitro-2-aminophenol. The 1,3,4-trichloro-7-nitro-phenoxazone-2 thus obtained of the probable formula

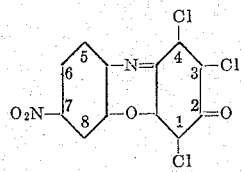

crystallizes from glacial acetic acid as compact red needles, which dissolve in concentrated sulfuric acid with a yellow-green color. Wool is dyed from the vat bright violet shades.

When acting with 4-nitro-1-amino-2-naphthol the corresponding product is obtained.

*Example 4*

A mixture of 24.8 parts of chloranil, 34 parts of 5-nitro-2-amino-phenol, 25 parts of anhydrous sodium acetate and about 250 parts of alcohol is boiled for some hours in an apparatus provided with a reflux condenser, the reaction product is filtered off while warm, washed out with alcohol and water and dried. When recrystallized from nitrobenzene the new condensation product represents bright violet-red crystals of a metallic lustre which dissolve in concentrated sulfuric acid with a brilliant green-blue color. The compound corresponds probably to the following formula:

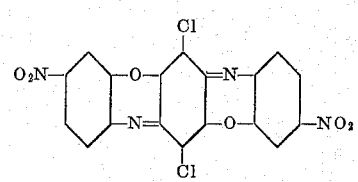

i. e. a dichloro-dinitro-triphen-dioxazine.

*Example 5*

When working according to Example 3, but while using 4-nitro-2-aminophenol, the 1,3,4-trichloro-6-nitrophenoxazone-2 of the probable formula:

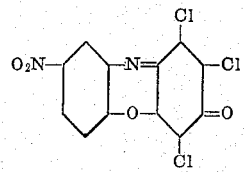

is obtained. When recrystallized from amyl-alcohol it represents orange-brown crystals. It dissolves in concentrated sulfuric acid with a green color.

*Example 6*

28 parts of chloranil are stirred for a short time with 16.8 parts of 4-methyl-5-nitro-2-aminophenol with the addition of 10 parts of anhydrous sodium acetate and about 250 parts of alcohol, until the formation of the new condensation product has been finished. The separated 1,3,4-trichloro-6-methyl-7-nitro-phenoxazone-2 of the probable formula

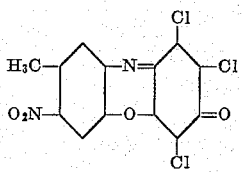

is filtered off by suction, washed with alcohol and water and dried. When recrystallized from acetic anhydride it is obtained as brilliant red needles which dissolve in concentrated sulfuric acid with a yellow-green color.

*Example 7*

When using instead of 4-methyl-5-nitro-2-aminophenol the equivalent quantity of 4-chloro-5-nitro-2-aminophenol and working otherwise as described in Example 6, the 1,3,4,6-tetrachloro-7-nitro-phenoxazone-2 of the probable formula:

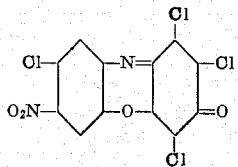

is obtained which crystallizes from amylalcohol as red needles and dissolves in concentrated sulfuric acid with a yellow-green color.

Example 8

27 parts of 2,3-dichloro-naphthoquinone-1,4- are stirred for some time with 15.4 parts of 5-nitro-2-aminophenol, 10 parts of anhydrous sodium acetate and some quantity of alcohol. The reaction product is filtered off, washed with alcohol and water and dried. When recrystallized from glacial acetic acid the 1-chloro-3,4-benzo-7-nitro-phenoxazone-2 of the probable formula:

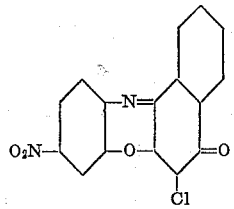

is obtained as orange crystals which dissolve in concentrated sulfuric acid with a red color.

In a like manner the condensation reaction may be carried out while using 1,4-naphthoquinone.

Example 9

A mixture of 24.8 parts of chloranil, 67 parts of 4-nitro-2-aminophenol-6-sulfonic acid of 72% strength, 50 parts of anhydrous sodium acetate, about 300 parts of alcohol and about 25 parts of water are boiled for some hours in an apparatus provided with a reflux condenser. The precipitate is filtered off by suction, washed with alcohol and dried. This intermediate compound dyes wool from an acid bath brown shades and dissolves in concentrated sulfuric acid with a dull red color, turning after a short time to blue. When pouring this blue solution into water and adding sodium chloride thereto, a dioxazine-dyestuff is obtained which dyes cotton from an acid bath brown-orange shades and dissolves in concentrated sulfuric acid with a bright blue color. The product corresponds probably with the formula:

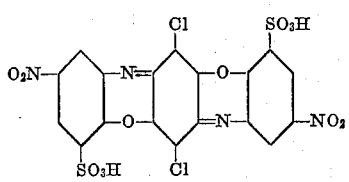

Example 10

When condensing with chloranil instead of the 4-nitro-2-aminophenol-6-sulfonic acid the 6-nitro-2-amino-phenol-4-sulfonic acid, an intermediate is obtained, dyeing wool from an acid bath likewise brown shades. When treating it with sulfuric acid a dioxazine-dyestuff is obtained dyeing wool reddish brown shades. It dissolves in concentrated sulfuric acid with a bright blue color.

Example 11

A mixture of 24.8 parts of chloranil, 44.2 parts of the sodium salt of 2-amino-4,6-dinitrophenol, 30 parts of sodium acetate and about 200 parts of alcohol of about 90% strength are boiled for about 5 hours in an apparatus provided with a reflux condenser. The formed condensation product which corresponds probably with the formula:

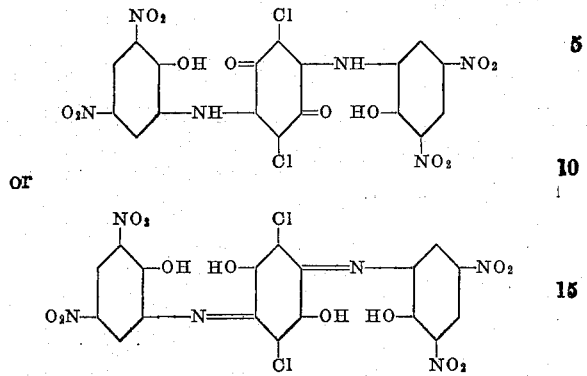

is after cooling down filtered off, washed out with alcohol and water and dried. It crystallizes from nitrobenzene as reddish brown needles melting above 300°. It dissolves in concentrated sulfuric acid with a reddish brown color.

1 part of this intermediate is poured into 10 parts of concentrated sulfuric acid. After a short time the coloration of the solution turns from reddish brown to violet blue. The reaction mass is poured on ice. The formed dichloro-tetra-nitro-triphen-dioxazine of the probable formula:

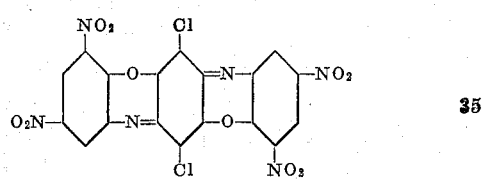

is filtered off, washed out and dried. From nitrobenzene it crystallizes as bluish red needles melting above 300°. It dissolves in concentrated sulfuric acid with a pure violet-blue color.

Example 12

A mixture of 45 parts of bromanil, 15.4 parts of 5-nitro-2-aminophenol, 10 parts of anhydrous sodium acetate and about 250 parts of alcohol is well stirred for some time. The formed 1,3,4-tribromo-7-nitro-phenoxazone-2 of the formula:

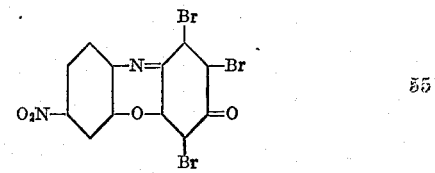

is filtered off, washed with alcohol and water and dried. It separates from hot propylalcohol when cool as compact brown-red crystals dissolving in concentrated sulfuric acid with a green color.

We claim:—

1. Oxazone compounds corresponding to the general formula:

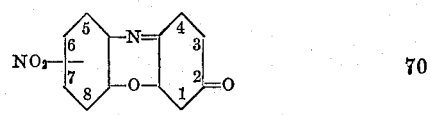

in which both nuclei may be linked with a benzo nucleus, both nuclei may contain halogen atoms, which products are intensely colored.

2. Oxazone compounds corresponding to the general formula:

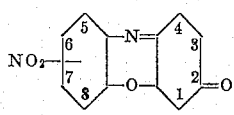

wherein both nuclei may contain halogen atoms, which products are intensely colored.

3. The 1,3,4-trichloro-7-nitro-phenoxazone-2 of the formula:

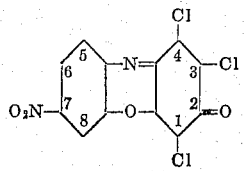

which product crystallizes from glacial acetic acid as compact red needles, which dissolve in concentrated sulfuric acid with a yellow-green color, and dyes wool from the vat bright violet shades.

4. The 1,3,4-trichloro-6-nitrophenoxazone-2 of the formula:

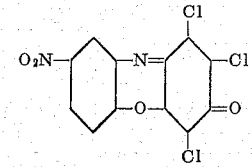

which product recrystallizes from amylalcohol as orange-brown crystals, which dissolve in concentrated sulfuric acid with a green color.

GEORG KALISCHER.
WERNER ZERWECK.